: 3,098,750
Patented July 23, 1963

3,098,750
METHOD OF PREPARING TOASTED DEHYDRATED ONIONS
Arthur N. Prater, Sherman Oaks, and Thomas M. Lukes, Santa Clara, Calif., assignors to Consolidated Foods Corporation, a corporation of Maryland
No Drawing. Filed July 10, 1961, Ser. No. 122,662
8 Claims. (Cl. 99—204)

This invention relates to sautéed flavored dehydrated onions and to the process of onion toasting to produce a sautéed onion flavored product.

Toasted dehydrated onion products have long been commercially made and marketed, the several varieties being generally distinguished by the size of the pieces, from large slices to powdered. The toasted onion products are made from the already dehydrated onions by subjecting the dehydrated pieces to heat for long periods of time. The products are highly desirable as food seasonings because of their unique aromatic caramelized flavor and odor of sautéed onions. Toasted onions are regularly added to soups and liver sausage, especially Braunschweiger, liver pudding, and liverwurst.

Where the word flavor is used herein to describe the quality of toasted onion it is intended that it also include the associated odor which goes to make up the whole seasoning effect, having great similarity to sautéed onions as prepared by competent cooks.

It has been found that certain varieties of onions, for examples, White Sweet Spanish, Grano, and Southport White Globe, when dehydrated in pieces or slices in the usual way, may be subsequently readily toasted to give well flavored and uniformly brown toasted onion products. On the other hand, certain varieties of onions, such as, for example, W-45 and Creoles, while highly desirable for making the commercially desired light-colored dehydrated onions, may not be readily toasted to yield onion products of uniform flavor or color, and require, even for a non-uniform toasted product, a longer time for toasting. Since these varieties (producing inferior toasted products) are highly desirable for making the plain dehydrated onion products, because of their light color and high solids content, an unsolved problem has existed on how to bring about uniform toasting of dehydrated onions made from these varieties. The distribution of the reducing sugars and other ingredients which produce the toasting, within the structure of many varieties of onions, is not uniform, and results in a non-uniform toasted product.

The sugar content, for example, varies from the inside of the onion to the outer layers, and also from the growing root to the tip, and when onions with average low sugar content are used, the irregularity in toasting effect from piece to piece is quite apparent. The low average content of reducing sugars in the hard-to-toast varieties is in the range of 8 to 10 percent (bone dry basis in comparison to 30 to 45 percent (bone dry basis) reducing sugars in the easily toasted varieties, with intermediate varieties of intermediate toasting capabilities.

We have discovered that toasted onion products of improved seasoning quality and of more uniform appearance may be made by partly or wholly rehydrating the dehydrated onion pieces prior to toasting, and then subjecting them to toasting temperatures for the time necessary to produce the desired color and flavor. We have further discovered that the seasoning quality and appearance may be further much improved by soaking the hard-to-toast dehydrated onion products in either hot or cold aqueous suspensions of finely divided onion powder, or in aqueous extracts of raw or dried onion, or in raw or blanched onion juice, or in aqueous solutions of reducing sugars, amino acids, or hydrolyzed protein, separately or in combinations.

The toasting effect in every case is a combined function of temperature and time of toasting. The toasting to a desired degree may be hastened by raising the temperature or by lengthening the time. Practically, the toasting temperatures are held in the range from 160° F. to 350° F. and the time may vary from a few minutes to 30 hours or more.

The degree of toasting is generally measured by the change in color from nearly white to brown. An empirical "optical index" and method of testing has been adopted by the American Dehydrated Onion and Garlic Association of San Francisco, California. The standard test, for toasted onion products, described in the published Official Standards of this Association, reads:

"Procedure: Mix prepared sample (1 gram ground to pass a 20 mesh screen with 100 ml. 10% sodium chlorine solution and allow to stand 15 minutes with occasional stirring. Filter through Whatman No. 12 filter paper, returning filtrate until crystal clear. Determine percent transmission of filtrate with machine (spectrophotometer) standardized at 100% transmission with 10% salt solution used for extraction.

"Calculation: Calculate optical density on the basis of 1% solution, 420 mu wave length and 50 mm. cell path. Optical density value multiplied by 1000 gives conversion to optical index."

The presently accepted range of optical index for commercial toasted onion products is from 900 to 1700, as defined by the American Dehydrated Onion and Garlic Association. The following typical examples illustrate the invention. In all the samples, the onion pieces were toasted by heating them spread out on a tray, at 180° F. for the times indicated.

| No. | Description | Optical Density on Toasting For— | | | | Hours For 1,000 Opt. Dens. (estimated) |
|---|---|---|---|---|---|---|
| | | 8 hrs.[1] | 12 hrs. | 24 hrs. | 36 hrs. | |
| 1 | Southport White Globe, no treatment. | 1,100 | 2,004 | 3,605 | 4,502 | 6 |
| 2 | Creole, no treatment. | 355 | 403 | 762 | 1,013 | 35 |
| 3 | Creole, treated with raw Southport White onion juice. | 1,040 | 1,154 | 2,005 | 2,917 | 11 |
| 4 | Creole, treated with 12% slurry of Southport onion powder. | 710 | 1,293 | 1,952 | 2,583 | 9 |
| 5 | Creole, treated with 1% Lysine solution in water. | 1,105 | 953 | 1,992 | 2,543 | 13 |
| 6 | Creole, treated with 1% Protose peptone in water. | 755 | 780 | 1,370 | 1,922 | 16 |
| 7 | Creole onions treated with 20% dextrose in water. | 655 | 1,134 | 2,115 | 2,977 | 13 |
| 8 | Creole treated with blanched Southport White onion juice. | 1,040 | | | | 8 |
| 9 | Creole treated with extract from 20% slurry of Southport onion powder. | 880 | | | | 9 |

[1] NOTE.—The 8-hour tests were made on different lots of onions from the other tests at longer periods of toasting.

While the above examples are selected from a large number of experiments, as illustrative of our invention, it will be understood that improved toasting may be attained under many variations of concentration of a single toasting agent, and of combinations of them, differences in temperature, in time of treatment, and in the particular variety of onion from which the toasting agent is obtained or of which the toasted product is made. The amount of the aqueous treating liquid absorbed also influences the toasting results, and may vary from complete or maximum re-hydration to a moistening of the surfaces. Dehydrated onions normally have about 4 percent moisture content.

We have observed that when the raw juice is heated or the extracts of dehydrated onion are made with hot water, the toasted product is a little different in flavor, perhaps described as less harsh. It was also observed that filtered extracts of dehydrated onion powder gave toasted onion products a more uniform appearance, free from spots, as compared to the results using suspended onion powder or slurries.

The preferred toasting agent for addition to hard-to-toast dehydrated onion pieces is raw onion juice derived from varieties of onions (for example Southport White Globe) which are relatively easy to toast, as described in Example 4. We have found that substantially all of the hard-to-toast varieties are improved as to color uniformity, time of treatment and flavor by moistening the dehydrated pieces with onion juice prior to toasting.

The improved rate of toasting when a toasting agent is employed, has also resulted when much higher temperatures (and much shorter times) are used, as in a continuous toaster, where toasting at 300° to 320° F. may be accomplished in minutes.

When toasting those varieties of onions which are difficult to toast to a uniform color, the addition of the toasting agents as above described produced uniformity of appearance and of flavoring quality. The quality of the flavor is also improved because of the shortening of the time of exposure for toasting.

The objectives stated in the beginning have been accomplished.

We claim:
1. The method of preparing toasted dehydrated onion, comprising the steps of partially rehydrating dehydrated onion pieces with an aqueous toasting agent selected from the group consisting of an aqueous slurry of onion powder, an aqueous extract of dehydrated onion, fresh onion juice, blanched onion juice, an aqueous solution of amino acid, an aqueous solution of protein hydrolyzates and an aqueous solution of reducing sugars, and then toasting said rehydrated pieces at temperatures within the range of about 160° to 350° F. for a length of time to give the desired degree of toasting.

2. The method as claimed in claim 1 in which the onion toasting agent is fresh onion juice.

3. The method as claimed in claim 1 in which the onion toasting agent is blanched onion juice.

4. The method as claimed in claim 1 in which the onion toasting agent is a aqueous slurry of dehydrated onion powder.

5. The method as claimed in claim 1 in which the onion toasting agent is a cold water extract of dehydrated onion powder.

6. The method as claimed in claim 1 in which the onion toasting agent is a hot water extract of dehydrated onion powder.

7. The method as claimed in claim 1 in which the onion toasting agent is an aqueous solution of amino acid.

8. The method as claimed in claim 1 in which the onion toasting agent is an aqueous solution of reducing sugars.

References Cited in the file of this patent

UNITED STATES PATENTS

| | | |
|---|---|---|
| 2,541,701 | Karmen | Feb. 13, 1951 |
| 2,619,424 | Masure | Nov. 25, 1952 |
| 2,882,609 | Templeton | Apr. 21, 1959 |
| 3,063,848 | Van Gelder | Nov. 13, 1962 |

OTHER REFERENCES

Von Loesecke: "Drying and Dehydration of Foods," 1955, 2nd Edition, pp. 113 and 114.